United States Patent
Kalaboukis

(10) Patent No.: US 11,403,709 B1
(45) Date of Patent: Aug. 2, 2022

(54) VISUALIZING INVESTMENT CHANGES USING AUGMENTED REALITY

(71) Applicant: Wells Fargo Bank, N.A., San Francisco, CA (US)

(72) Inventor: Chris Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/370,471

(22) Filed: Jul. 8, 2021

Related U.S. Application Data

(63) Continuation of application No. 15/366,747, filed on Dec. 1, 2016, now Pat. No. 11,094,017.

(51) Int. Cl.
*G06Q 40/06* (2012.01)
*G06T 19/00* (2011.01)
*G02B 27/01* (2006.01)

(52) U.S. Cl.
CPC ......... *G06Q 40/06* (2013.01); *G02B 27/0172* (2013.01); *G06T 19/006* (2013.01); *G02B 2027/014* (2013.01); *G02B 2027/0138* (2013.01); *G02B 2027/0141* (2013.01)

(58) Field of Classification Search
CPC ............... G06Q 40/06; G02B 27/0172; G02B 2027/0138; G02B 2027/014; G02B 2027/0141; G06T 19/006
See application file for complete search history.

(56) References Cited

U.S. PATENT DOCUMENTS

| | | | |
|---|---|---|---|
| 8,606,657 B2 | 12/2013 | Chesnut et al. | |
| 8,761,811 B2 | 6/2014 | Alonzo | |
| 9,189,021 B2 | 11/2015 | Jerauld | |
| 9,214,137 B2 | 12/2015 | Bala et al. | |
| 9,239,618 B2 | 1/2016 | Cho et al. | |
| 9,286,727 B2 | 3/2016 | Kim et al. | |
| 9,317,835 B2 | 4/2016 | Calman et al. | |
| 10,022,632 B1 | 7/2018 | Mcadoo et al. | |
| 2012/0232966 A1 | 9/2012 | Calman et al. | |
| 2012/0242696 A1 | 9/2012 | Martin | |
| 2013/0293580 A1 | 11/2013 | Spivack | |
| 2015/0052080 A1 | 2/2015 | Letzeiser | |
| 2015/0062120 A1 | 3/2015 | Reisner-Kollmann et al. | |
| 2015/0095263 A1 | 4/2015 | Globe et al. | |

(Continued)

FOREIGN PATENT DOCUMENTS

WO 2015075705 A2 5/2015

OTHER PUBLICATIONS

"Tango," Google, https://get.google.com/tango, Jul. 19, 2016, 4 pages.

(Continued)

*Primary Examiner* — Bennett M Sigmond
*Assistant Examiner* — Marla Hudson
(74) *Attorney, Agent, or Firm* — Merchant & Gould P.C.

(57) ABSTRACT

A method implemented on an augmented reality (AR) device includes accessing a user's investment strategy and selecting a material object. The material object and investment controls are displayed on a display screen of the AR device. The user alters the investment strategy using the investment controls. Alternative replacement objects are generated based on changes that the user makes to his or her investment strategy. One or more replacement objects are projected onto the display to represent an alternative material object that the user can afford based on the changed investment strategy.

20 Claims, 11 Drawing Sheets

(56) References Cited

U.S. PATENT DOCUMENTS

2016/0109954 A1  4/2016  Harris et al.
2016/0148433 A1  5/2016  Petrovskaya et al.
2016/0225091 A1  8/2016  Varma et al.
2017/0178236 A1  6/2017  Saigh et al.

OTHER PUBLICATIONS

Berthiaume, "TechBytes: two reasons why Microsoft HoloLens may disrupt retail (and one why it might not)", Chain Store Age, Feb. 2, 2015, https://www.chainstoreage.com/article/techbytes-two-reasons-why-microsoft-hololens-may-disrupt-retail-and-one-why-it-might-not, 2 pages.
"ART: Augmented Reality by Transamerica," Transamerica, https://www.trsretire.com/apps.jsp, Jul. 19, 2016, 2 pages.
Paul, "Generation tech demands dig-retail; from social networking to augmented reality, kids have an unprecedented level of digital know-how, and they're demanding the same of retailers. Here's how a few brands are answering the call," Strategy, 30, Apr. 2012, 5 pages.
"Augmented reality-based videos put fun back into retirement planning," Desjardins Insurance, https://www.desjardins.com/ressources/pdf/2014102901-e.pdf, Oct. 29, 2014, 2 pages.

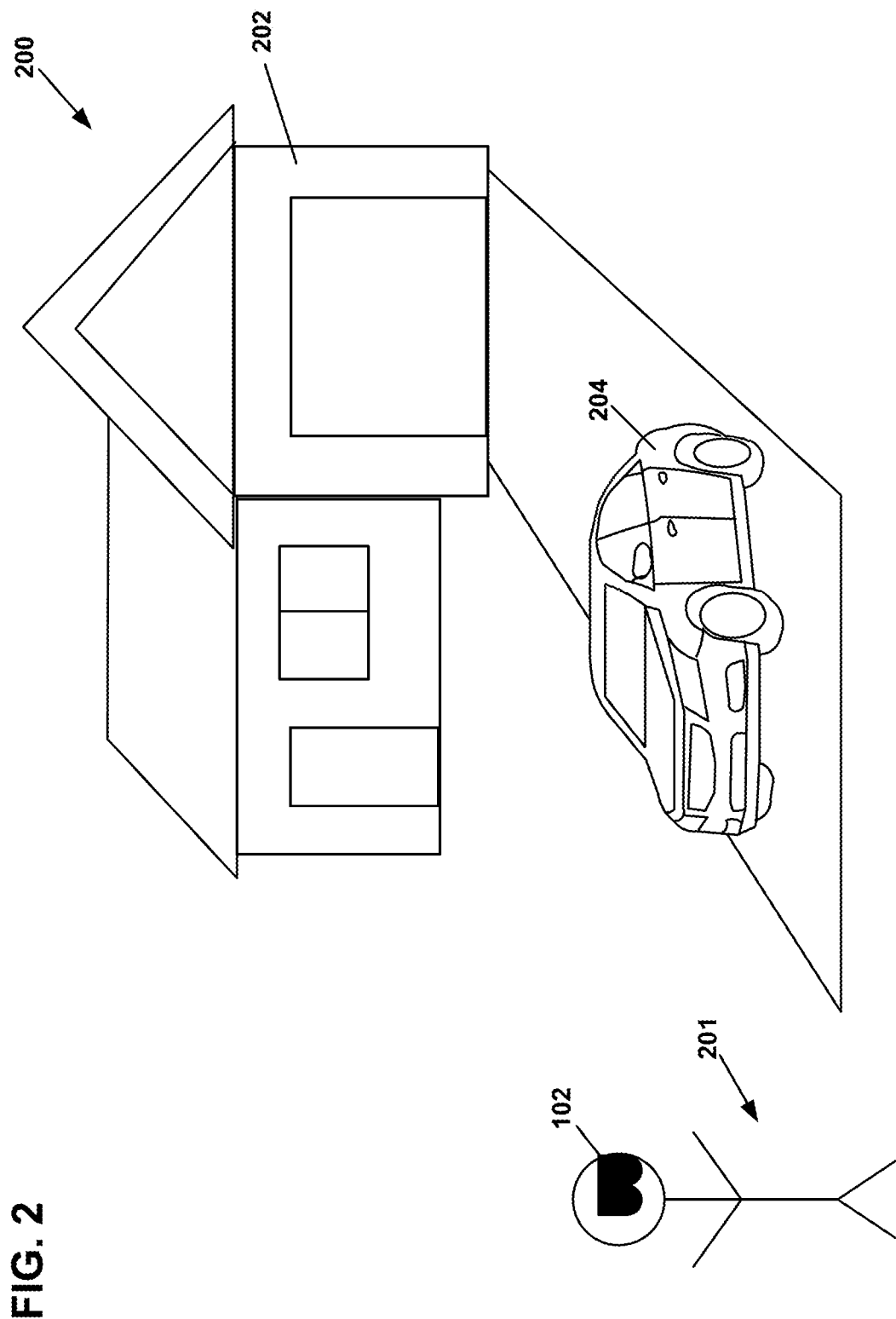

FIG. 6
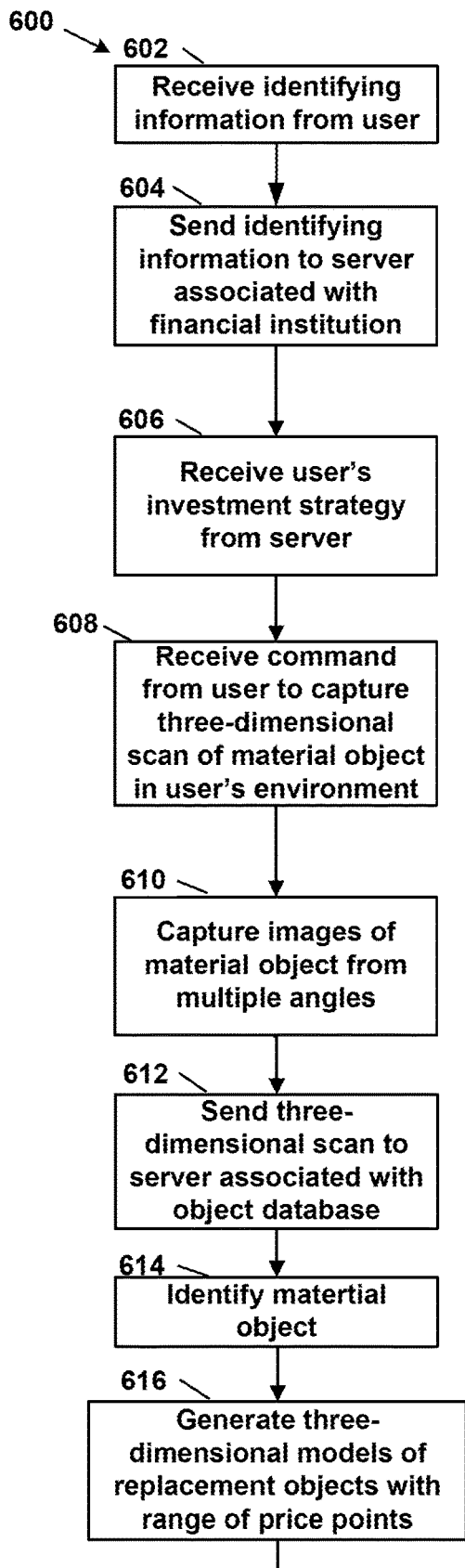
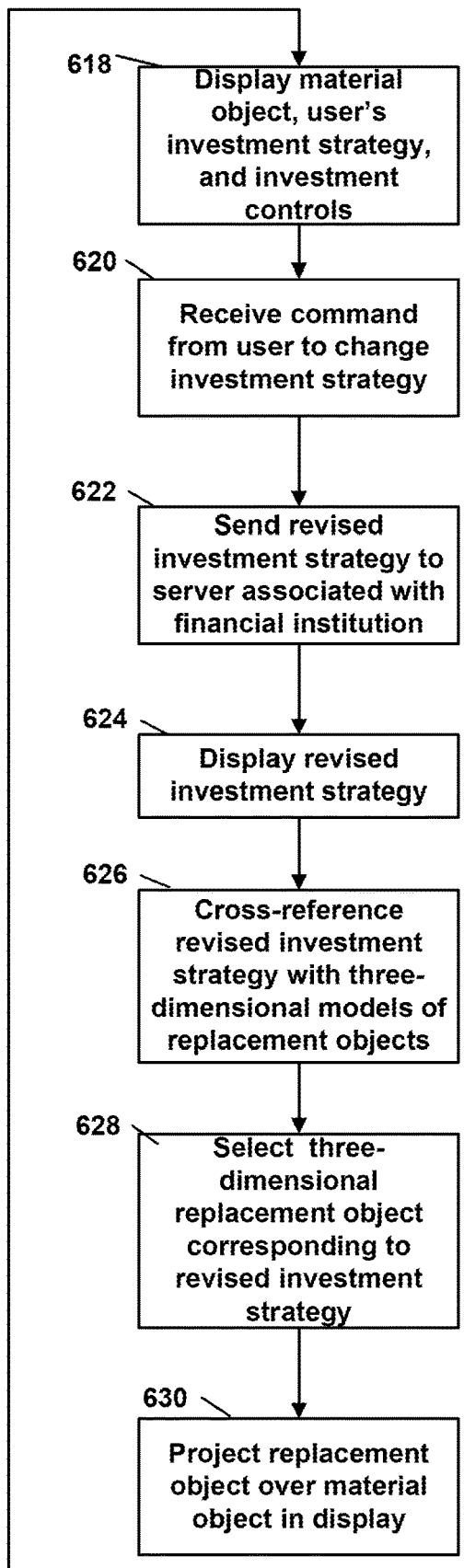

VISUALIZING INVESTMENT CHANGES USING AUGMENTED REALITY

BACKGROUND

Augmented reality is a technology in which a person's conception of reality can be enhanced, typically through augmented sound, video or graphics displays. The augmentation is typically implemented via various technologies, such as a headset that may be worn by the person. One or more augmented views may be presented to the person through the headset.

The augmented reality headset typically includes a wearable computer and an optical display mounted to the headset. The wearable computer may include a wireless telecommunication capability, permitting a wireless connection from the wearable computer to a server computer. Because of the wireless telecommunication capability, the augmented reality headset may be used to interact with the server computer to accomplish various tasks.

SUMMARY

Embodiments of the disclosure are directed to a method of visualizing investment strategy changes implemented on an augmented reality (AR) device, the method comprising: accessing an investment strategy for a user; selecting a material object; ascertaining multiple replacement objects of varying prices corresponding to the material object; displaying the material object and one or more investment controls on a display of the AR device; receiving a command from the user to change the investment strategy by adjusting the one or more investment controls; determining a replacement object corresponding to the changed investment strategy; and projecting the replacement object in the display.

In another aspect, one or more computer-readable media having computer-executable instructions embodied thereon that, when executed by one or more computing devices, cause the computing devices to: access an investment strategy for a user; select a material object; ascertain multiple replacement objects of varying prices corresponding to the material object; display the material object, the user's investment strategy, and one or more investment controls on a display of the AR device; receive a command from the user to change the investment strategy by adjusting the one or more investment controls; determine a replacement object corresponding to the changed investment strategy; and project the replacement object over the material object in the display.

In yet another aspect, an AR device for evaluating financial investment strategies for a user is described, the device comprising: a processor; a camera; a display area; and system memory, the system memory including instructions which, when executed by the processor, cause the AR device to: receive identifying information from a user; send the identifying information to a server associated with a financial institution with which the user has an account; receive the user's investment strategy from the server; receive a command from the user to capture a three-dimensional scan of a material object in the user's environment; capture one or more images of the material object from one or more angles of view; send the three-dimensional scan to a server associated with an object database; identify the material object; generate a plurality of three-dimensional models of replacement objects having a range of price points; display the material object, the user's investment strategy, and one or more investment controls on a display of the AR device; receive a command from the user to change the investment strategy by adjusting the one or more investment controls; send the revised investment strategy to the server associated with the financial institution; display the revised investment strategy on the display; cross-reference the revised investment strategy with the plurality of three-dimensional models of replacement objects; select one of the three-dimensional models of replacement objects corresponding to the revised investment strategy; and project the replacement object over the material object in the display.

The details of one or more techniques are set forth in the accompanying drawings and the description below. Other features, objects, and advantages of these techniques will be apparent from the description, drawings, and claims.

DESCRIPTION OF THE DRAWINGS

FIG. 2 shows an example of a user environment including the AR device of FIG. 1.

FIG. 6 shows a flowchart for another example method of visualizing investment strategy modifications implemented on an AR device.

DETAILED DESCRIPTION

The present disclosure is directed to systems and methods for using augmented reality (AR) to visualize changes in a customer's investment strategy. This can allow a customer to more readily visualize how changes in the customer's investments can impact material objects in the customer's everyday environment. Examples of such objects can include objects having a higher extrinsic value, such as cars, houses, boats, jewelry, and the like.

In some embodiments, the AR device scans a three-dimensional image of a real object in the environment of a user or customer. For example, a customer may wish to know how changing his or her investment strategies can affect the type of car he or she can afford, so the user's car is scanned. Alternatively, the customer may not have a car already or is not near his or her car, but still wishes to visualize car options that he or she may afford. The customer then selects an object by browsing or inputting the particular object the customer wants to examine. The AR device displays controls to adjust the user's investment strategy. These controls can be manipulated by the user. In response to the adjustment of the controls, an image of a different car is projected over the view of the user's car in the AR display. If the user did not already have a car, a new car is projected in the user's environment. This different car may be more or less expensive than the user's car based on the user's investment strategy changes.

The systems and methods are generally described for an AR device that may be worn or carried by a user. An example of an AR device that may be worn by the user is an AR headset. An example of an AR device that may be carried by the user is a smart telephone or tablet computer that includes AR components such as a processor, display and camera and an AR software application. Other types of computing devices may be used.

The AR headset includes a wearable computer, a camera and an optical display. The wearable computer includes a wireless telecommunication capability, permitting a wireless connection between the wearable computer and one or more server computers. The wearable computer also includes voice recognition capability, permitting the user to direct the wearable computer via voice commands. In addition, in some implementations, the wearable computer also includes biometric capability such as facial recognition, retinal scan capability, finger print and voice print capability.

One type of AR headset described in this disclosure is a smart glass type of headset, similar to eyeglasses, which may be worn by the user. The user may view AR images in the glass portion of the headset. An example of a smart glass headset is Google Glass, from Google Inc. of Mountain View, Calif.

Figure 1:
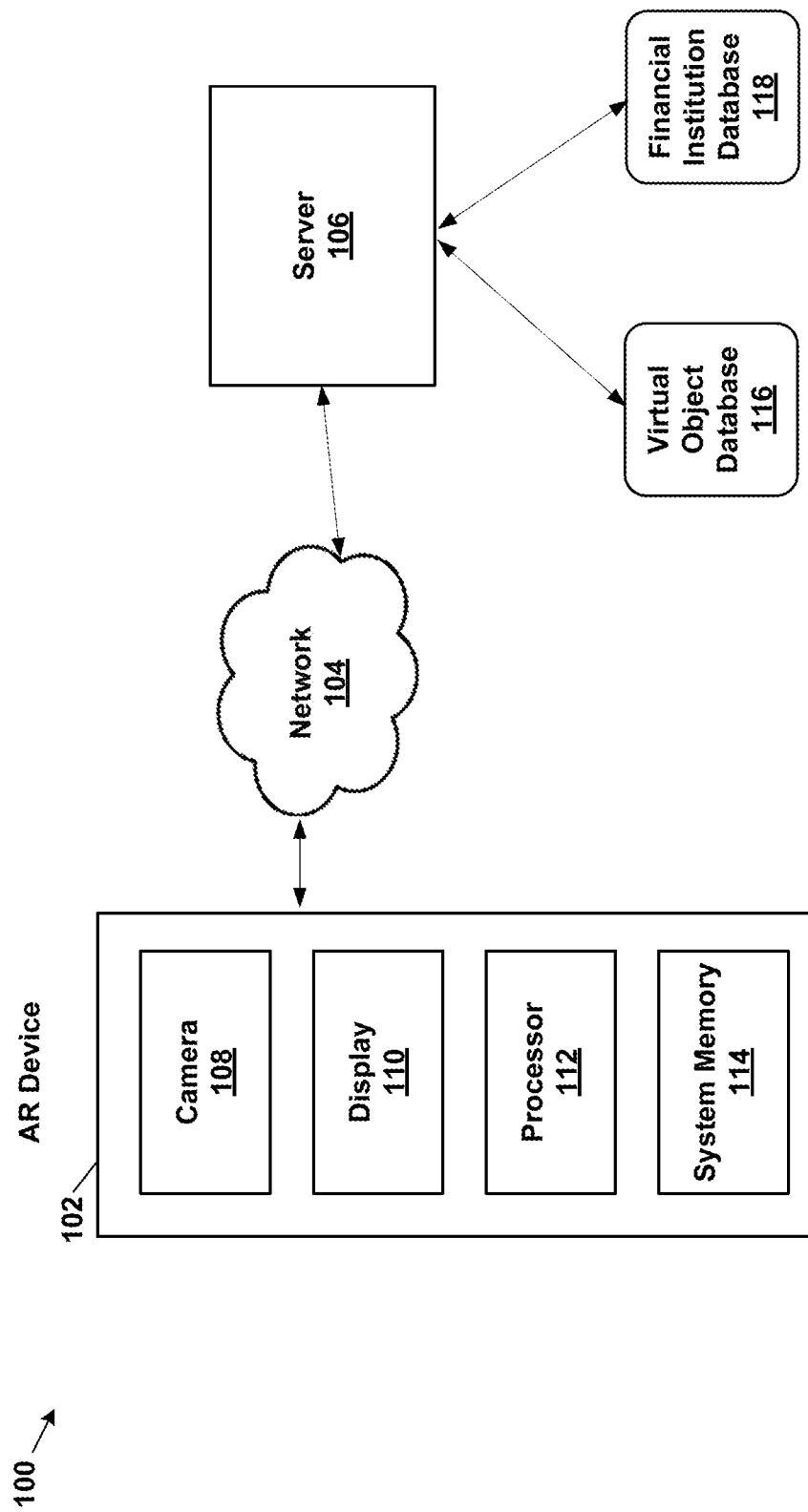
FIG. 1 shows an example system for visualizing investment strategy modifications implemented on an augmented reality (AR) device.

FIG. 1 shows an example system 100 that supports an AR display for visualizing investment strategy changes. The example system 100 includes an AR device 102, a network 104, and a server computer 106.

Example modules within the AR device 102 include a camera 108, a display 110, a processor 112, and system memory 114. The camera 108 is a camera that is built-in to AR device 102. Display 110 is a display that is also built-in to AR device 102. The processor 112 has wireless capability. The wireless capability may include Bluetooth, radio frequency identification (RFID) or similar types of wireless capability. System memory 114 includes software applications that may be installed on the AR device. When AR device 102 is an AR headset, camera 108, display, 110, processor 112, and system memory 114 are part of the AR headset.

The AR device 102 communicates with a network 104 that, in turn, communicates with a server computer 106. The network 104 may be a wireless "cloud network" which the AR device 102 communicates with via the processor 112. The AR device 102, network 104, and server may be connected in other ways, such as a hard wired connection. The server computer 106 is associated with a virtual object database 116 and at least one financial institution database 118.

The system memory 114 includes one or more software applications. One software application this is possibly included is a financial software application that supports online banking applications. Example online banking applications include account access, bill pay, electronic banking statements, etc. Other software on the system memory 114 instructs the AR device to evaluate financial investment strategies for a user.

When instructions on the system memory 114 are executed by the processor 112, the AR device 102 receives identifying information from a user. The identifying information is then sent from the AR Device 102 to the server 106 associated with a financial institution with which the user has an account. The user's investment strategy is then received from the server 106. The user's investment strategy includes information about the amount of money invested in various types of investments such as stocks, bonds, and mutual funds. The investment strategy may include information about how much money the user invests each month, how long the money is going to be invested, rates of return, and the like.

The AR device 102 receives a command from the user to select a material object. The material object may be personal property or real property. For example, the material object may be a house, a boat, a car, a bicycle, a piece of furniture, a piece of jewelry, or an electronic device. The user may input or select a material object or command the AR device 102 to capture a three-dimensional scan of a material object in the user's environment. For example, the user's environment may be the user's driveway and the material object is the user's car. The camera 108 of the AR device 102 then captures one or more images of the material object from one or more angles of view.

The material object is sent from the AR device 102 through the network 104 to the server 106 which communicates with the virtual object database 116. The virtual object database 116 is used to identify the material object. Three-dimensional models of replacements objects having a range of price points are generated. Then the material object, the user's investment strategy, and one or more investment controls are displayed on the display 110 of the AR device 102.

The AR device 102 receives a command from the user to change the investment strategy by adjusting the investment controls. The revised investment strategy is then sent to the server 106 from the AR device 102. The revised investment strategy is also displayed on the display 110 of the AR device 102. The revised investment strategy may be displayed in the form of charts, graphs, numerical figures, sliders, and the like. The revised investment strategy is cross-referenced with the three-dimensional models of replacement objects determined by the virtual object database 116 at the server 106. One of the three-dimensional models of replacement objects corresponding to the revised investment strategy is selected and received by the AR device 102. Finally, the selected replacement object is projected on the display 110 of the AR device 102.

The system memory 114 may include other software application and sets of instructions for implementation on the AR device 102. Other methods of evaluating financial investment strategies are described in this specification. Further details of the functionality of the AR device 102 are provided in the following figures.

FIG. 2 shows an example environment 200 of a user 201. In this example, the user 201 is looking at his or her house 202 with his or her car 204 in the driveway. The user may decide that he or she wants to determine if changing his or her investment strategy will have an impact on the type of car that the user can afford. The user 201 can activate the software application on the AR device 102. This could be done by opening an application on the user's smartphone or by putting on an AR headset and activating the software with a voice command. The software application may require user authentication to access the user's investment strategy. For example, the software application may prompt the user 201 to enter a password or PIN, speak for voice authentication, or scan part of the user's body for identification.

Figure 3A:
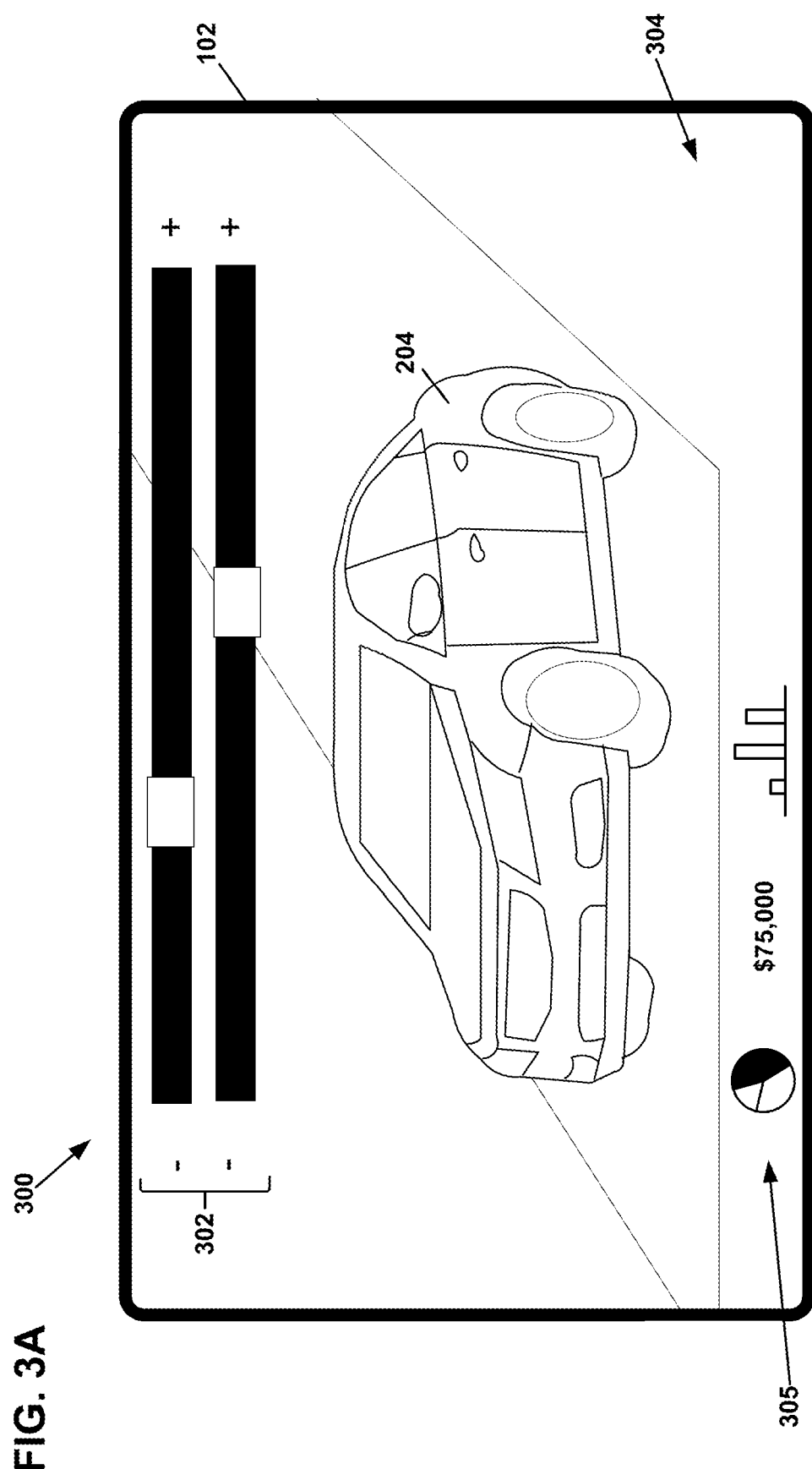
FIGS. 3A-3C show example displays of the AR device of FIG. 2.

FIG. 3A shows an example user interface 300 for visualizing investment strategy changes on an AR display. The user is viewing the user's car 204 through the AR device 102 and can see the environment 200 including the car 204 on the display 304 of the AR device 102. At the top of the display 304 are one or more investment controls 302. At the bottom of the display, the user's current investment strategy 305 is displayed. While the AR device 102 is focused on the user's car 204, the user 201 can activate the camera of the AR device 102 to capture a three-dimensional scan of the car

204. The user 201 can then adjust his or her investment strategy by adjusting the investment controls 302.

The investment controls 302 may adjust various aspects of an individual's investment strategy. Such aspects may include a time frame for the investment, a mix of asset types, the amount invested in dollars or percentage of income per month or per year, level of risk, and amount remaining to be saved for a particular item. In one example, the investment controls shown in FIG. 3A could be for amount invested per month and duration of the investment. These controls could be dependent upon each other so that if the user adjusts the amount invested per month, the duration of the investment may change automatically.

Figure 3B:
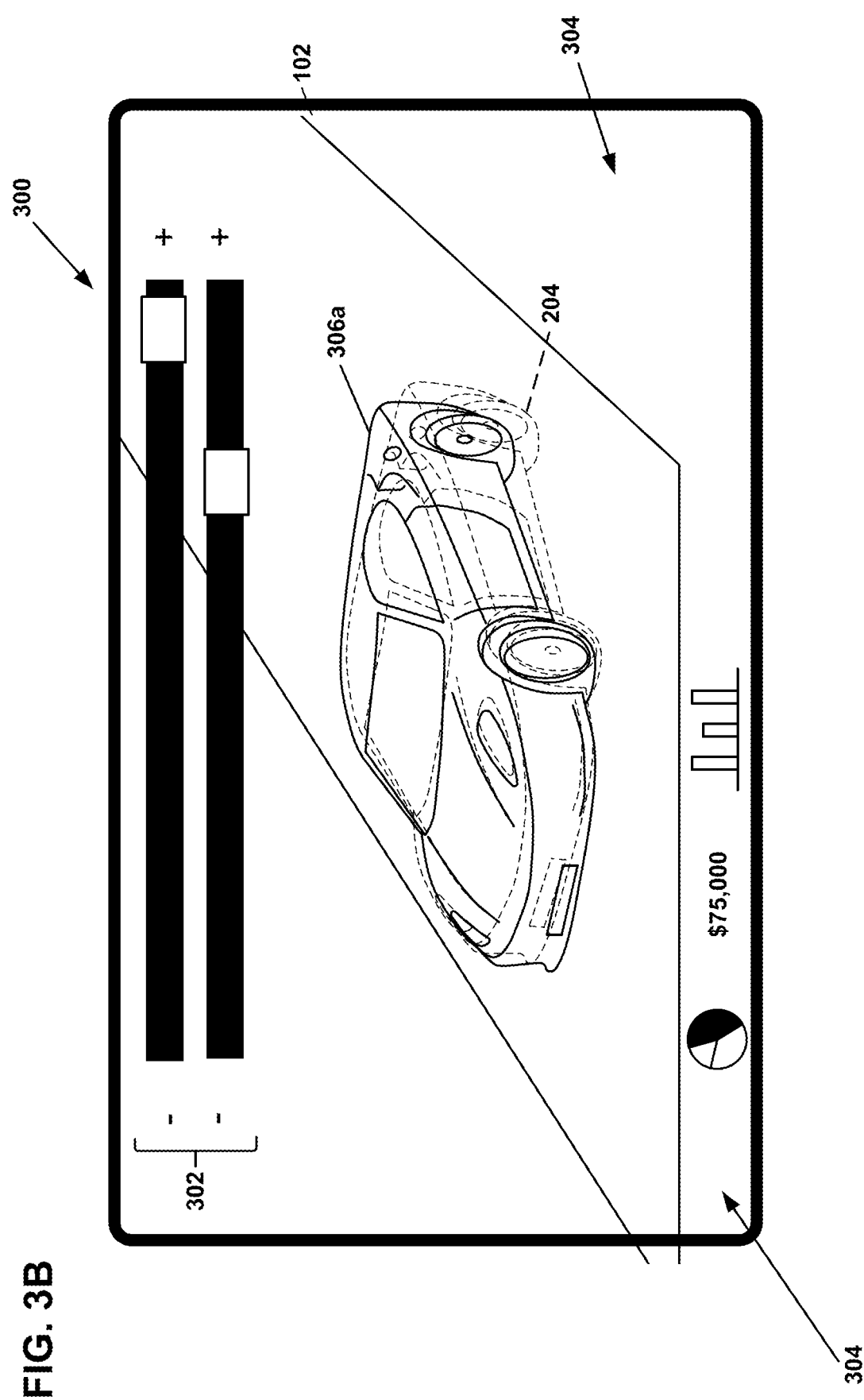

For example, if the user is interested in buying a car, such as a more expensive sports car as shown in FIG. 3B, and the user wishes to purchase that car in 18 months, the user could adjust an investment control 302 for duration of investment to be 18 months. In response, the slider for the investment control 302 representing the amount invested per month may automatically adjust itself to a higher or lower amount depending on how much money the user needs to save in that 18 month period of time.

In another example, the user may wish to see how different mixes of investment types might affect his or her ability to afford a house. There may be sliders for various investment types such as domestic stocks, foreign stocks, bonds, short-term investments, cash, real estate, commodities, and other investments. By adjusting investment controls 302 for each asset or investment type, the display of the material object may change to reflect the user's ability to afford a house due to the updated investment strategy.

In yet another example, the investment controls 302 may include sliders to adjust the level of risk of the user's investments. By adjusting the risk level, other controls for investment types may automatically adjust. For example, if the user is willing to try riskier investments, controls for amounts invested in stocks may increase while controls for amounts saved in cash may decrease. If the user prefers a less risky investment, for instance if the investment is intended to be short term, the user could adjust an investment control 302 for risk to be lower, and the bonds and cash controls would automatically adjust in the opposite directions.

In FIG. 3B, the user interface 300 shows the investment controls 302 at different settings than those in FIG. 3A. Also, the AR display 304 shows a first replacement car 306*a* projected on top of the user's car 204. The user's car 204 may be completely obscured by the first replacement car 306*a* or may be visible through the project of the image of the first replacement car 306*a,* as shown in FIG. 3B. The user's investment strategy 305 is updated to reflect the changes made to the investment controls 302. In this example, the user has changed his or her investment strategy such that he or she has more money to spend on a car and can afford a more expensive model. If the user adjusts the investment controls 302 again, a different car may be displayed.

Figure 3C:
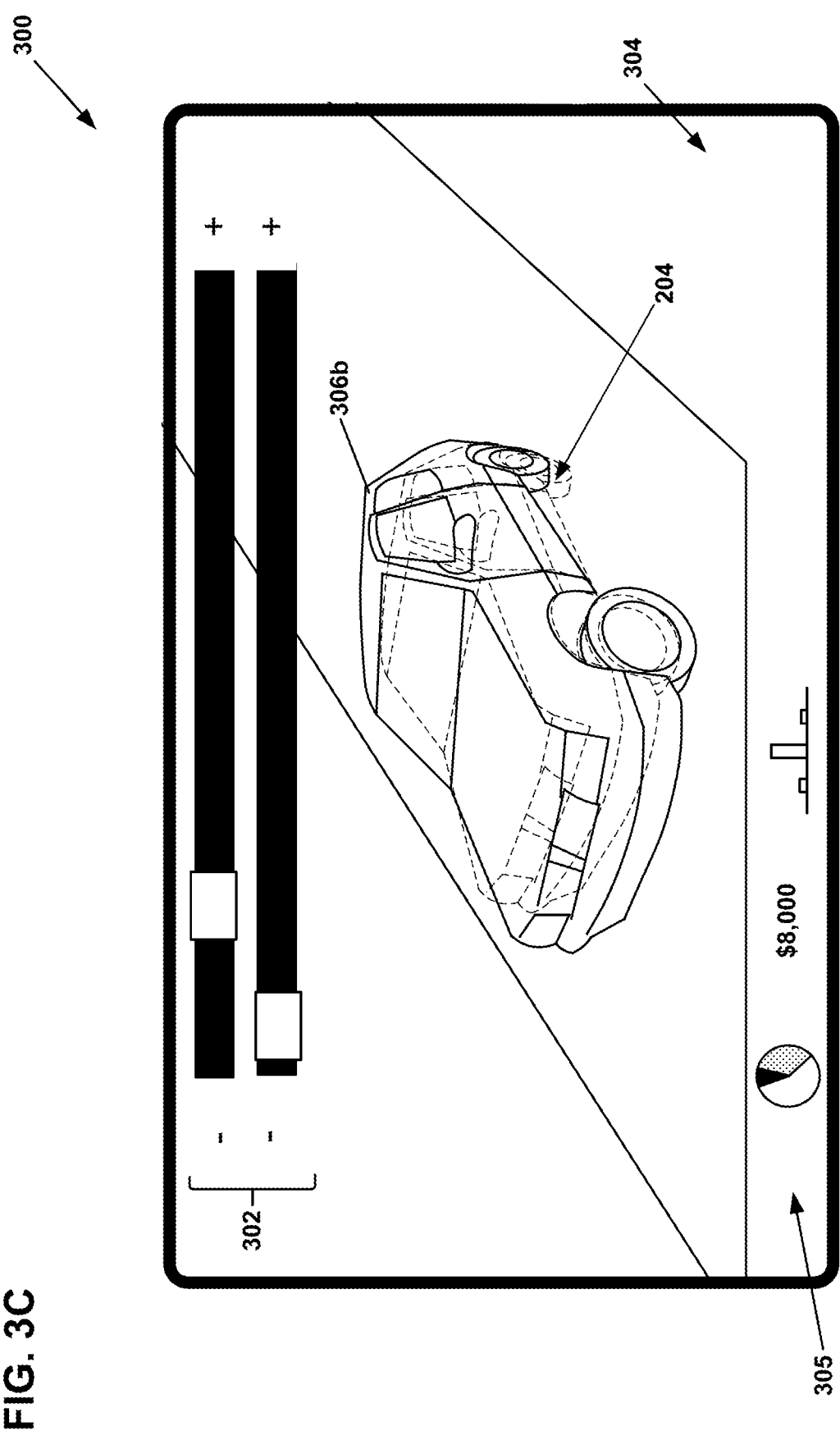

For example, in FIG. 3C, the user has adjusted the investment controls 302 so that he or she has less money to spend on a car. A second replacement car 306*b* is now projected over the user's car 204. The updated investment strategy 305 is displayed as well. Here, the investment strategy selected by the user shows that the user can then afford a less expensive model of car.

Now that the user has seen how his or her investment strategy affects the car he or she can afford, the user may want to know how investment strategy changes may affect his or her ability to afford a home. The user directs the AR device 102 to focus on the user's house 202 and capture an image of the house 202. Alternatively, the user may not have a house and selects a house as the material object.

Figure 4A:
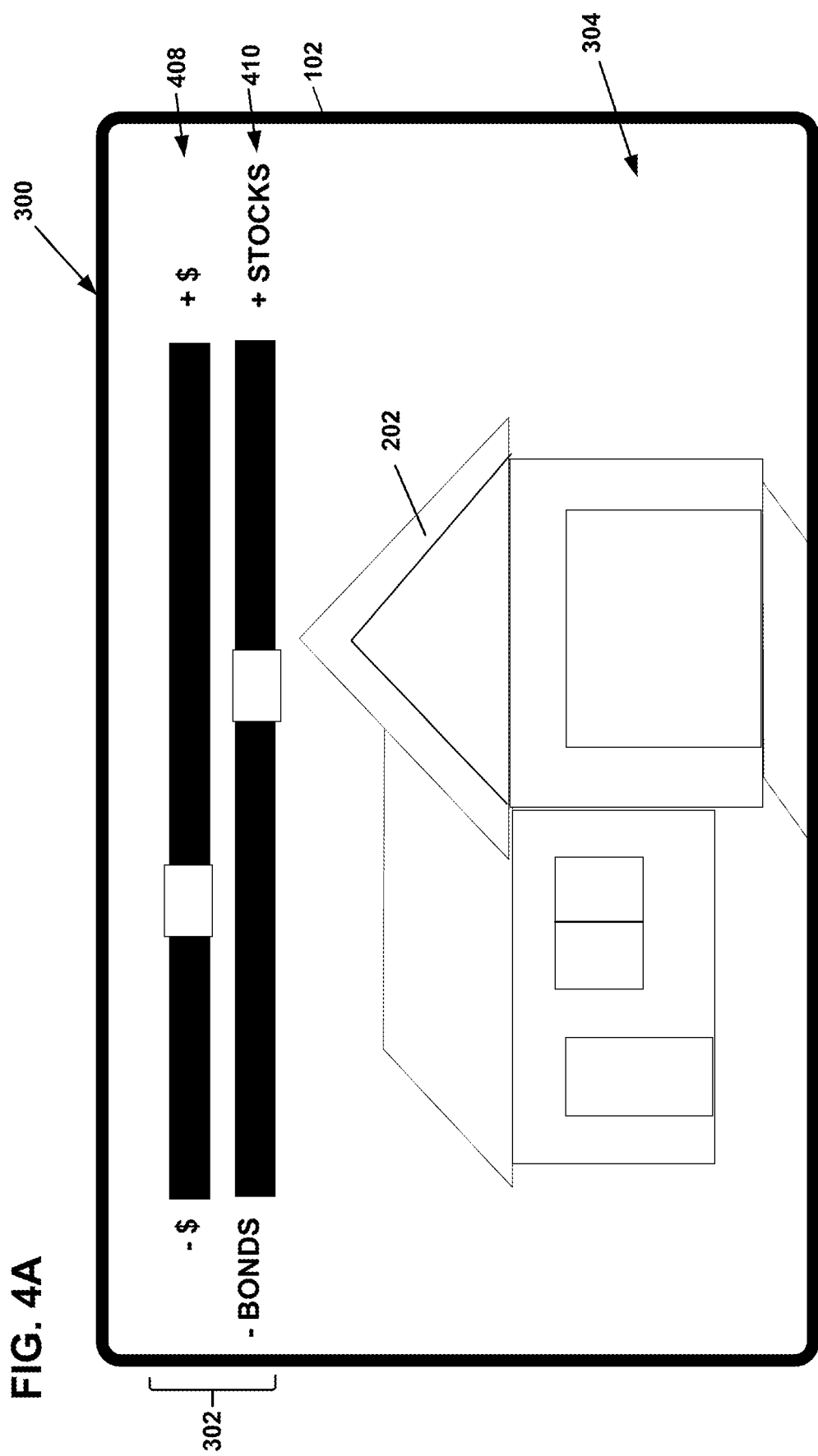
FIGS. 4A-4C show other example displays of the AR device of FIG. 2.

In FIG. 4A, the user's house 202 is shown on the display 304 of the AR device 102 on the user interface 300. Investment controls 302 are displayed at the top of the display. In this example, the investment controls 302 include a slider 408 for amount invested and a slider 410 for the ratio of stocks and bonds in which the user's money is invested. Thus, the user's current investment strategy is embodied within the investment controls 302.

Figure 4B:
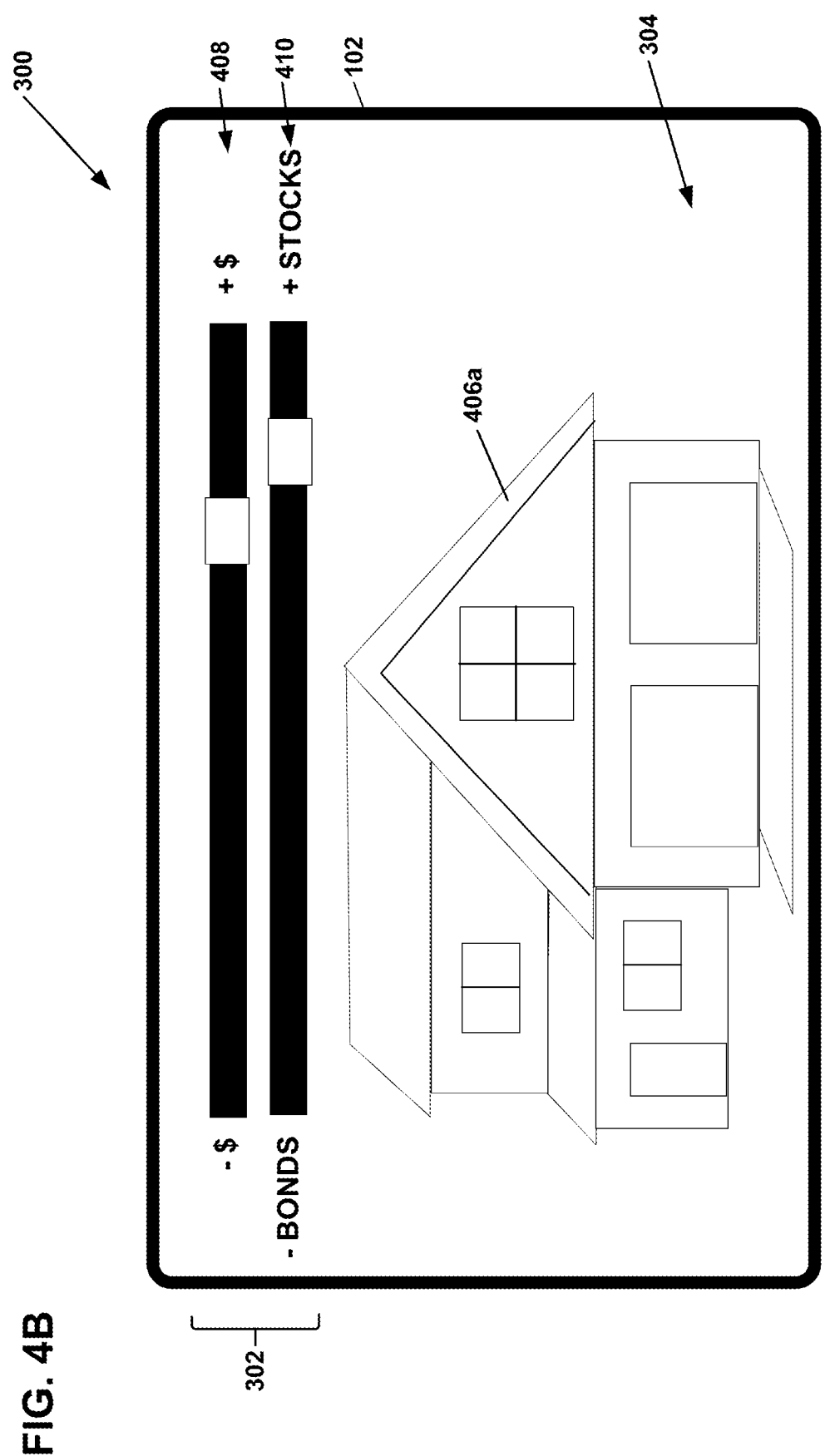

In FIG. 4B, the user has adjusted the investment controls 302 so that a greater amount of money is being invested (408) and a greater percentage of the investment is in stocks instead of bonds (410). Again, an image of a first replacement house 406*a* is projected over the user's actual house 202. In this example, the user has adjusted the investment controls 302 such that he or she can afford a larger house than the user currently owns.

Figure 4C:
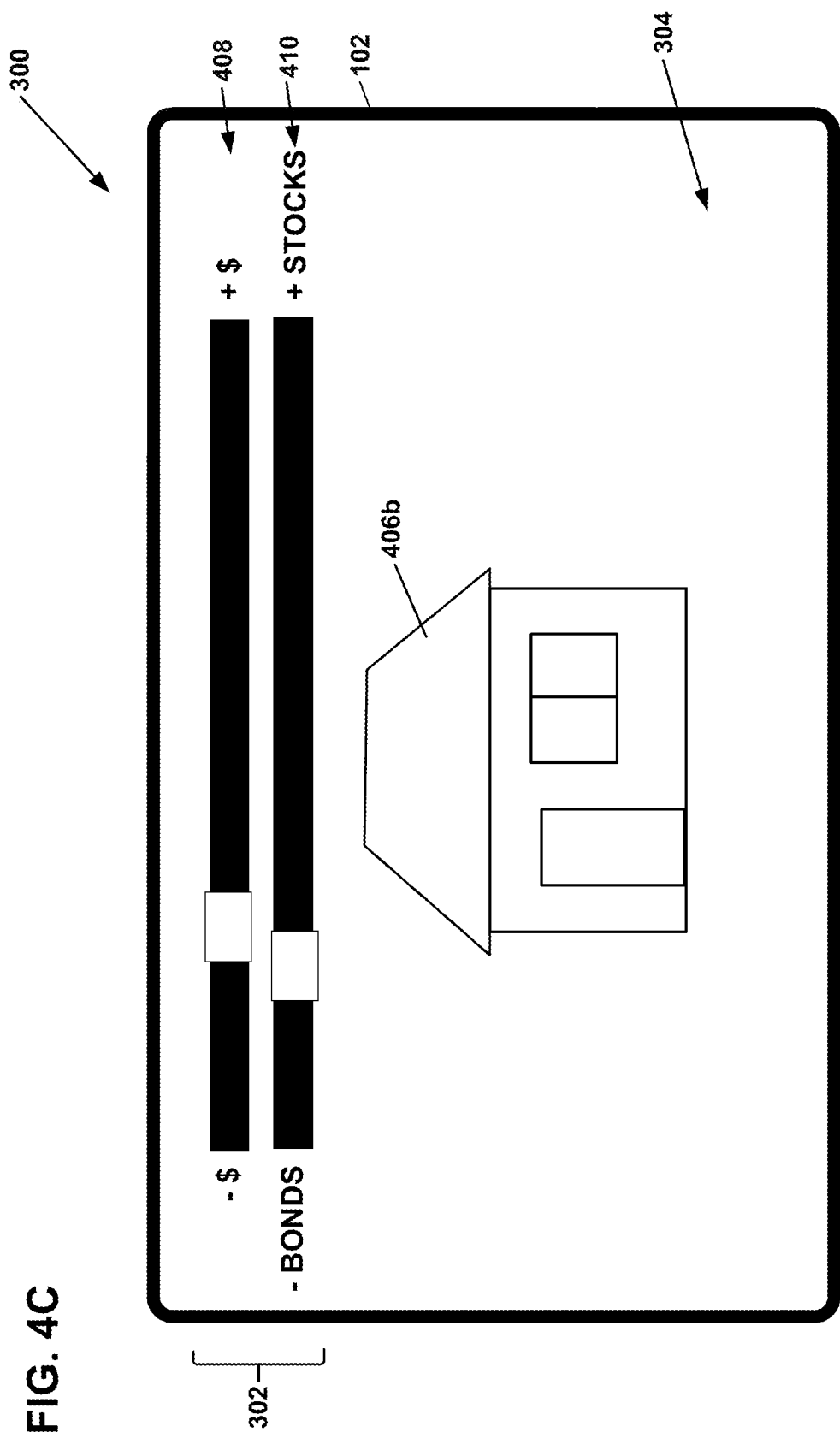

In FIG. 4C, the user has adjusted the investment controls 302 such that the user would have less money to spend on a house. Here, the amount invested slider 408 has been moved so that less money is invested. The ratio of stock and bonds slider 410 has been moved so that a greater percentage of the investment is in bonds instead of stocks. A second replacement house 406*b* is projected over the user's actual house, but this time it is much smaller.

FIGS. 3 and 4 show just one example of a way in which augmented reality can be used to visualize a user's investment strategy changes and how they affect a user in a material way. Other configurations are possible. For example, a user could use the augmented reality system to browse through possible items of personal property which the use could buy, but does not yet own. The options for personal property may include only those which the user can afford based on his or her current investment strategy, but then the selection could change based on adjusting controls to modify the investment strategy. Alternatively, the augmented reality system could include a listing of the user's personal property and real property so that the user could select one of the items of property to see how investment changes would affect his or her ability to afford a more or less expensive alternative, without actually looking at the user's piece of property in the user's environment.

Figure 5:
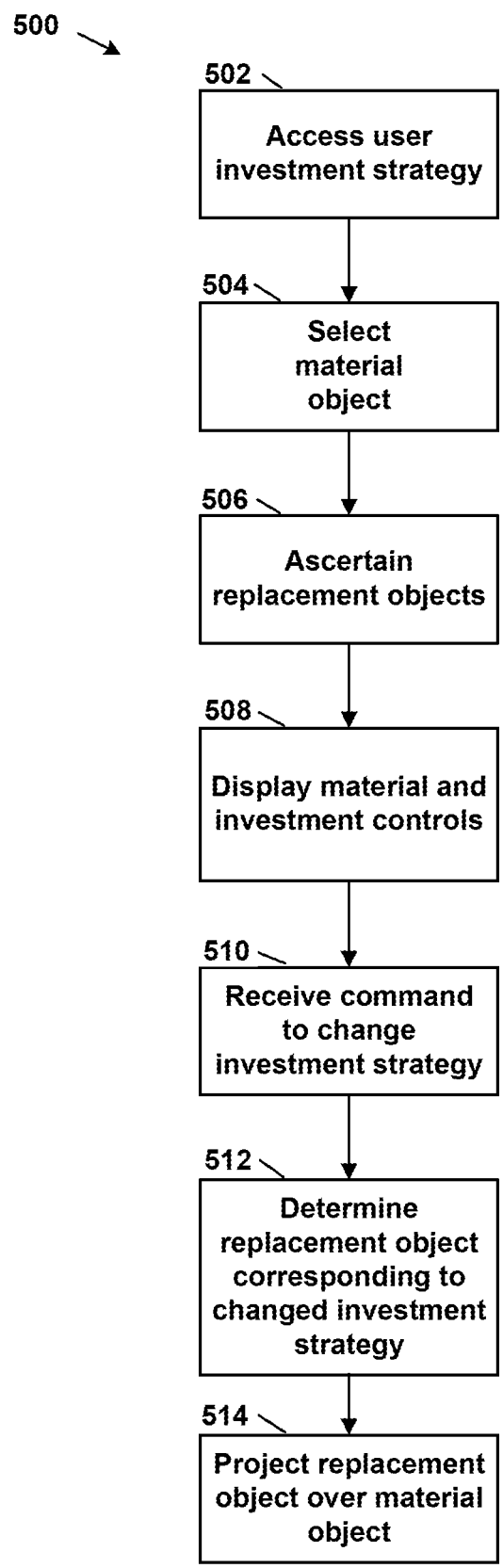
FIG. 5 shows a flowchart for an example method of visualizing investment strategy modifications implemented on an AR device.

FIG. 5 shows a flowchart of a method 500 implemented on a computing device, such as the AR device 102, for visualizing investment strategy changes for a user.

At operation 502, the user's investment strategy is accessed. The user's investment strategy may be saved within an account that the user has with a financial institution. The investment strategy can include how much money the user is investing, the types of investments the user is investing in, how often the user is contributing to investments, the rates of return on the investments, and the like. Accessing the user's investment strategy may require receiving identifying information from the user. This information may be obtained by facial recognition software integrated into the AR device 102. Alternatively, a retinal scan or fingerprint scan may be performed. The user may also use a traditional login with a username and password or a PIN. The AR device 102 may also utilize voice recognition software to identify the user. Other identification methods are possible. Once the identifying information for the user is obtained, the AR device 102 sends that identifying information to server 106 associated with a financial institution with which the user has an account. The server 106 accesses a financial institution database 118 to obtain the user's investment strategy.

At operation 504, a material object is selected. This may entail receiving a command from the user to capture an image of a particular material object in the user's environment. For example, as described above in FIG. 2, the material object may be the user's car or the user's house. Other examples are possible. The command may be a physical gesture made by the user, a voice command, or a command typed or selected by the user. The camera 108 of the AR device 102 then captures one or more images of the real object from one or more angles of view. This may involve the user moving around the real object to capture multiple images with the AR device 102. Alternatively, the material object may be selected by selecting icons representing property owned by the user, browsing possible objects on the display of the AR device and selecting a material object, or inputting voice or text commands to select a material object. The material object may be property that is already owned by the user, or it may be property that the user does not yet own but would like to purchase.

At operation 506, multiple replacement objects of varying prices corresponding to the material object are ascertained. This involves sending the selected material object to the virtual object database 116 to identify the real object. This may include comparing the scanned image of the real object with other images in the virtual object database 116 to find a match. The virtual object database 116 is also used to find replacement objects that correspond to the real object but have different price points. For example, the virtual object database may find replacement objects that have prices higher than the real object and replacement objects that have prices lower than the real object.

At operation 508, the material object and one or more investment controls are displayed on the AR device 102. Example displays are shown in FIGS. 3A and 4A, described above. The material object is can be displayed by simply showing the material object in the display 110 of the AR device 102 as it exists in the user's environment. Alternatively, the material object may be projected over an object in the user's environment. In yet another alternative, the material object may be projected on the display to appear as if it is in the user's environment. One or more investment controls are displayed. The investment controls may be shown with a display of the user's investment strategy. If the investment strategy is displayed in the form of sliders or selectors, the investment strategy and the controls may be combined into one visual representation. The investment controls may adjust the amount of money invested, the types of investment, the amounts of money invested in each type of investment, the duration of investment, and the like. The investment controls may be adjusted by means of sliders, toggles, typed values, checkboxes, buttons, scroll bars, drop down menus, and the like.

At operation 510, a command is received from the user to change the user's investment strategy by adjusting the investment controls. This may include receiving one or more inputs from the user to adjust one or more of the investment controls. These inputs could be physical gestures, voice commands, text entry, or other commands that can be received by the AR device 102. Once the user has adjusted the investment controls, the revised investment strategy is communicated to the server 106. The revised investment strategy may be displayed on the display 110.

At operation 512, a replacement object corresponding to the material object and the changed investment strategy is determined. The server 106 receives the changed investment strategy and cross-references it with the multiple replacement objects determined in operation 506. The server 106 may then communicate these replacement objects to the AR device 102 so that the user may select one replacement object for the material object. Alternatively, the server 106 may automatically select one replacement object.

At operation 514, the replacement object is projected in the display 110. As is shown in FIGS. 3B, 3C, 4B, and 4C, a three-dimensional object image of the replacement object may be displayed over the user's real object in the environment of the user. Alternatively, the replacement object may be projected elsewhere in the user's environment.

The method 500 may further include receiving a command from the user to execute the revised investment strategy. This may be done with a command such as those described in operation 504. The revised investment strategy is then communicated to the server 106 associated with the user's financial institution. The financial institution will then implement the new investment strategy on behalf of the user.

The method 500 may also include receiving a command from the user to exit the display. At any point during the operation of the method, the user may decide he or she wishes to exit the application. The user may communicate a command to the AR device 102 to shut down the display 110.

FIG. 6 shows a flowchart for an alternative method 600 that may be implemented on a system such as the system 100 depicted in FIG. 1. This method 600 is similar to the method 500 described above in FIG. 5 and applies to users viewing a material object in their environment.

At operation 602, identifying information is received at the AR device 102 from the user. The identifying information may be in the form of a user login or may be obtained from a biometric reading such as a fingerprint scan.

At operation 604, the user's identifying information is sent to a server 106 associated with a financial institution at which the user has an account. The server 106 then uses the user's identifying information to access the user's investment strategy from a financial institution database 118.

At operation 606 the user's investment strategy is sent from the server 106 and is received at the AR device 102.

At operation 608, a command is received at the AR device 102 from the user to capture a three-dimensional scan of a material object in the user's environment.

At operation 610, the camera 108 of the AR device 102 is then used to capture one or more images of the material object. The AR device 102 may instruct the user to move around the real object to capture images from multiple views and angles of the material object in order to produce a three-dimensional scan.

At operation 612, the AR device 102 sends the three-dimensional scan to the server 106.

At operation 614, the server 106 communicates with the virtual object database 116 to identify the material object represented by the three-dimensional scan.

At operation 616, the server 106 and the virtual object database 116 generate three-dimensional models of replacement objects corresponding to the material object. The replacement objects are valued at a range of price points in relation to the value of the material object.

At operation 618, the material object, the user's investment strategy, and one or more investment controls are displayed on the display 110 of the AR device 102.

At operation 620, a command is received from the user to change his or her investment strategy by adjusting the investment controls. The investment controls are adjusted by inputs such as physical gestures, voice commands, text entry, and the like.

At operation 622, the revised investment strategy is sent from the AR device 102 to the server 106 associated with the user's financial institution.

At operation 624, the revised investment strategy is displayed on the display 110 of the AR device 102.

At operation 626, a replacement object corresponding to the material object in the user's environment is determined based on the revised investment strategy by cross-referencing the revised investment strategy with the multiple three-dimensional models of replacement objects.

At operation 628, one of the multiple replacement objects corresponding to the revised investment strategy is selected and sent back to the AR device 102.

At operation 630, the replacement object is projected over the material object in the display.

The method 600 may further involve receiving a command from the user to execute the revised investment strategy. The revised investment strategy is then communicated from the AR device to the server 106 which communicates the command to the user's financial institution.

Figure 7:
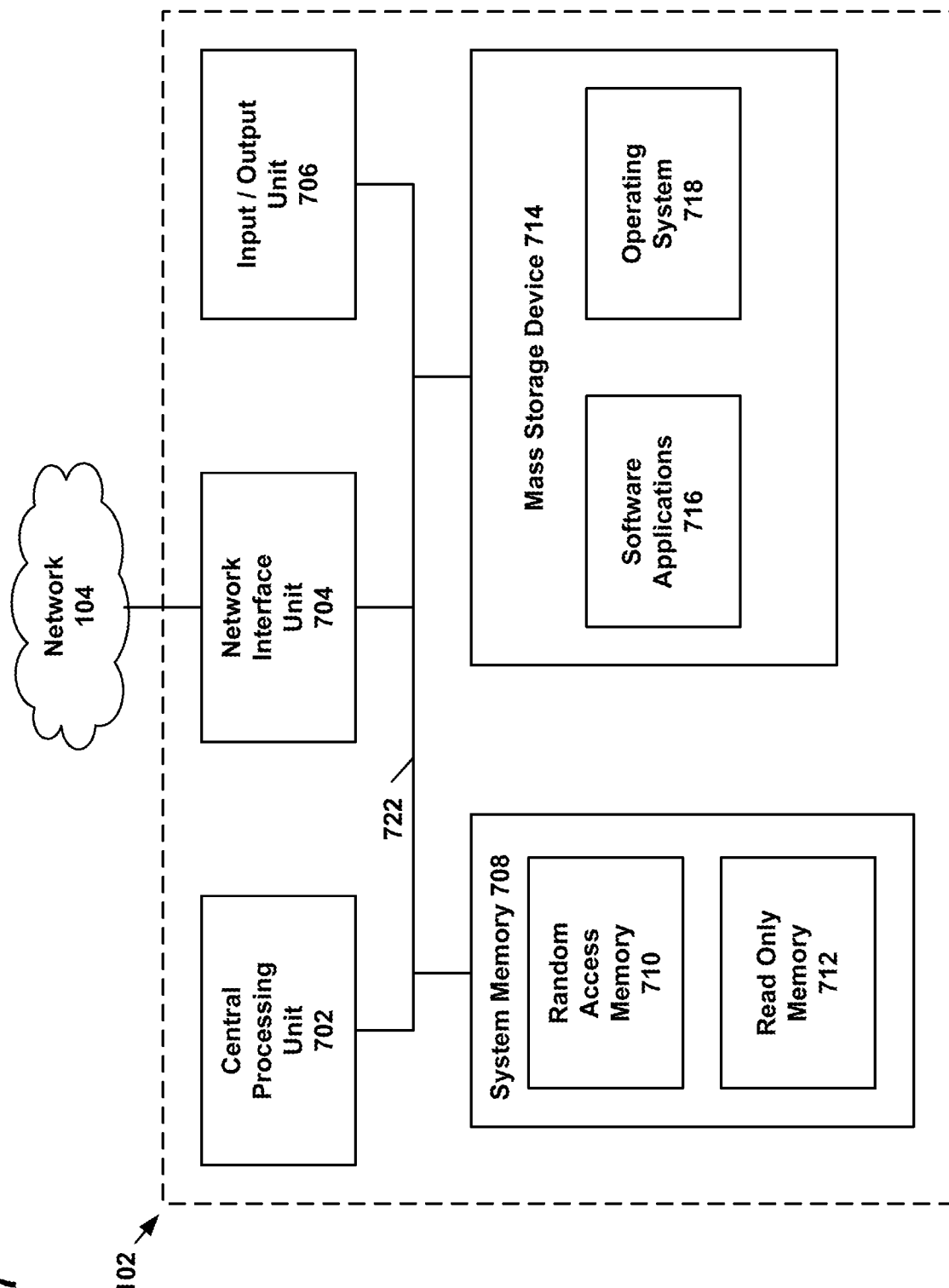
FIG. 7 shows example physical components of the AR device of FIG. 1.

As illustrated in the example of FIG. 7, the AR device 102 includes at least one central processing unit ("CPU") 702, a system memory 708, and a system bus 722 that couples the system memory 708 to the CPU 702. The system memory 708 includes a random access memory ("RAM") 710 and a read-only memory ("ROM") 712. A basic input/output system that contains the basic routines that help to transfer information between elements within the AR device 102, such as during startup, is stored in the ROM 712. The AR device 102 further includes a mass storage device 714. The mass storage device 714 is able to store software instructions and data, including software application 716 and an operating system 718. A central processing unit, system memory and mass storage device similar to that in FIG. 7 are also included in the server computer.

The mass storage device 714 is connected to the CPU 702 through a mass storage controller (not shown) connected to the system bus 722. The mass storage device 714 and its associated computer-readable data storage media provide non-volatile, non-transitory storage for the AR device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the AR device 102.

According to various embodiments of the invention, the AR device 102 may operate in a networked environment using logical connections to remote network devices through the network 104, such as a wireless network, the Internet, or another type of network. The AR device 102 may connect to the network 104 through a network interface unit 704 connected to the system bus 722. It should be appreciated that the network interface unit 704 may also be utilized to connect to other types of networks and remote computing systems. The AR device 102 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the AR device 102 can store software instructions and data. The software instructions include an operating system 718 suitable for controlling the operation of the AR device 102. The mass storage device 714 and/or the RAM 710 also store software instructions, that when executed by the CPU 702, cause the AR device 102 to provide the functionality of the AR device 102 discussed in this document. For example, the mass storage device 714 and/or the RAM 710 can store software instructions that, when executed by the CPU 702, cause the AR device 102 to display received financial data on the display screen of the AR device 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method of visualizing investment strategy changes implemented on an augmented reality device, the method comprising:
   accessing a user's investment strategy from a server associated with a financial institution;
   capturing, with the augmented reality device, one or more images of a material object in an environment of the user;
   identifying multiple replacement objects corresponding to the material object that have different values than a value of the material object;
   displaying, in an augmented reality environment, the material object and one or more investment controls for modifying the user's investment strategy;
   receiving an adjustment by the user of the one or more investment controls to change the investment strategy for the user;
   selecting one of the multiple replacement objects, wherein a value of the selected one of the replacement objects corresponds to the changed investment strategy; and
   projecting the selected one of the replacement objects over the material object in the augmented reality environment.

2. The method of claim 1, wherein accessing comprises:
   receiving identifying information from the user;
   sending the identifying information to the server associated with the financial institution with which the user has an account; and
   receiving the user's investment strategy from the server.

3. The method of claim 2, wherein the identifying information is one or more of a user login, facial recognition, retinal scan, fingerprint scan, and voice recognition.

4. The method of claim 1, further comprising:
receiving a command from the user to capture an image of the material object in the environment of the user; and
capturing one or more images of the material object in the environment from one or more angles of view.

5. The method of claim 1, further comprising:
sending the material object to a server associated with an object database;
identifying the material object; and
generating a plurality of three-dimensional models of the replacement objects having varying monetary values.

6. The method of claim 1, further comprising displaying the user's investment strategy in a form of numbers, figures, charts, and sliders.

7. The method of claim 1, further comprising:
displaying the changed investment strategy.

8. The method of claim 1, wherein the one or more investment controls include amount invested, type of investment, amount invested in each type of investment, and duration of investment.

9. The method of claim 1, wherein the one or more investment controls are adjustable using one or more of physical gestures, voice commands, and text entry.

10. The method of claim 1, wherein the one or more investment controls are adjustable using one or more of sliders, toggles, typed values, checkboxes, buttons, scroll bars, and drop down menus.

11. The method of claim 1, wherein selecting one of the multiple replacement objects is done automatically.

12. The method of claim 1, selecting one of the multiple replacement objects is done by the user from two or more replacement objects corresponding to the changed investment strategy.

13. One or more computer-readable media having computer-executable instructions embodied thereon that, when executed by one or more computing devices, cause the one or more computing devices to:
access a user's investment strategy from a server associated with a financial institution;
capture, with an augmented reality device, one or more images of a material object in an environment of the user;
identify multiple replacement objects corresponding to the material object that have different values than a value of the material object;
display, in an augmented reality environment, the material object and one or more investment controls for modifying the user's investment strategy;
receive an adjustment by the user of the one or more investment controls to change the investment strategy for the user;
select one of the multiple replacement objects, wherein a value of the selected one of the replacement objects corresponds to the changed investment strategy; and
project the selected one of the replacement objects over the material object in the augmented reality environment.

14. The one or more computer-readable media of claim 13, wherein the one or more computer-readable media has further computer-executable instructions embodied thereon that, when executed by the one or more computing devices, cause the one or more computing devices to:
identify information from the user in a form of facial recognition, retinal scan, fingerprint scan, or voice recognition;
send the identifying information to the server associated with the financial institution with which the user has an account; and
receive the user's investment strategy from the server.

15. The one or more computer-readable media of claim 13, wherein the one or more computer-readable media has further computer-executable instructions embodied thereon that, when executed by the one or more computing devices, cause the one or more computing devices to:
receive a command from the user to capture an image of the material object in the environment of the user; and
capture one or more images of the material object in the environment from one or more angles of view.

16. The one or more computer-readable media of claim 13, wherein the one or more computer-readable media has further computer-executable instructions embodied thereon that, when executed by the one or more computing devices, cause the one or more computing devices to:
send the material object to a server associated with an object database;
identify the material object; and
generate a plurality of three-dimensional models of the replacement objects having varying monetary values.

17. The one or more computer-readable media of claim 13, wherein the one or more investment controls include amount invested, type of investment, amount invested in each type of investment, and duration of investment.

18. The one or more computer-readable media of claim 13, wherein the one or more investment controls are adjustable using one or more of physical gestures, voice commands, and text entry.

19. The one or more computer-readable media of claim 13, wherein the computer-executable instructions further cause the one or more computing devices to display the changed investment strategy.

20. An augmented reality (AR) device for evaluating financial investment strategies for a user, the AR device comprising:
a processor;
a camera;
a display area; and
system memory, the system memory including instructions which, when executed by the processor, cause the AR device to:
access a user's investment strategy from a server associated with a financial institution;
capture one or more images of a material object in an environment of the user;
identify multiple replacement objects corresponding to the material object that have different monetary values than a monetary value of the material object;
display the material object and one or more investment controls for modifying the user's investment strategy;
receive an adjustment by the user of the one or more investment controls to change the investment strategy for the user;
select one of the multiple replacement objects, wherein a monetary value of the selected one of the replacement objects corresponds to the changed investment strategy; and
project the selected one of the replacement objects over the display of the material object.

* * * * *